United States Patent [19]

Lamparter

[11] Patent Number: 5,796,331
[45] Date of Patent: Aug. 18, 1998

[54] ILLUMINATED PIVOTAL SIGN ASSEMBLY

[75] Inventor: Ronald C. Lamparter, Grosse Pointe Shores, Mich.

[73] Assignee: Transpec Inc., Troy, Mich.

[21] Appl. No.: 525,115

[22] Filed: Sep. 8, 1995

[51] Int. Cl.[6] .................................................. B60Q 1/26
[52] U.S. Cl. .......................... 340/433; 340/487; 116/28 R; 40/564; 40/572; 40/578; 40/591
[58] Field of Search ........................... 340/433, 487, 340/488, 321; 116/28 R, 63 R; 40/541, 556, 564, 570, 572, 578, 591; 362/812; 439/343, 31, 33, 162, 164; 403/220, 221, 205

[56] References Cited

U.S. PATENT DOCUMENTS

| | | | |
|---|---|---|---|
| 3,133,265 | 5/1964 | Fultz | 340/433 |
| 4,096,551 | 6/1978 | Prester | 362/83 |
| 4,559,518 | 12/1985 | Latta, Jr. | 340/433 |
| 4,816,804 | 3/1989 | Reavell | 340/487 |
| 4,891,896 | 1/1990 | Boren | 340/541 |
| 5,036,307 | 7/1991 | Reavell et al. | 340/487 |
| 5,132,662 | 7/1992 | Burch | 340/433 |
| 5,233,773 | 8/1993 | Reynolds | 40/642 |
| 5,299,109 | 3/1994 | Grondal | 362/241 |
| 5,303,124 | 4/1994 | Wrobel | 362/20 |
| 5,345,705 | 9/1994 | Lawrence | 40/616 |
| 5,357,239 | 10/1994 | Lamparter | 340/433 |
| 5,406,250 | 4/1995 | Reavell et al. | 340/433 |

*Primary Examiner*—Jeffery Hofsass
*Assistant Examiner*—Julie Lieu
*Attorney, Agent, or Firm*—Reising, Ethington, Barnard & Perry

[57] ABSTRACT

A sign (10) includes a sign housing (16) having a pair of extension arms (102) extending therefrom for mounting purposes. The sign housing (16) includes light elements (28) to illuminate at least a portion of the sign (10). The sign housing (16) and extension arms (102) include channels therethrough to allow power conductors (52) to extend from the light element internal the sign housing (16) through the extension arms (102) to power source. The extension arm also receives and supports a hollow, L-shaped bushing (112) through which the power conductors extend. The bushings (112) are received in a mounting housing (122) which in turn secured to a support structure, such as a bus (12). The mounting housing (112) includes an actuator connected to the bushing (112) to pivot the sign (10).

20 Claims, 4 Drawing Sheets

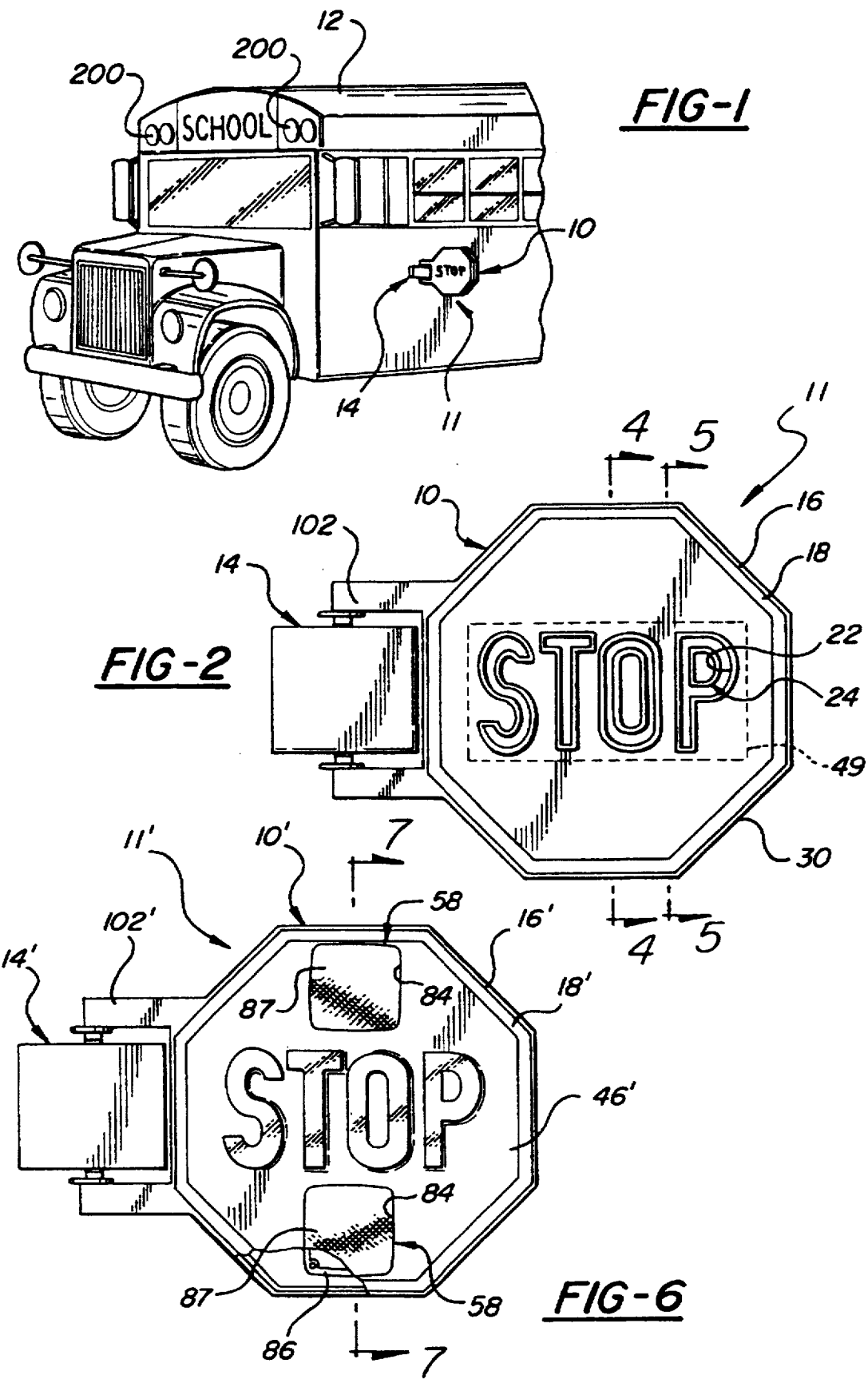

ILLUMINATED PIVOTAL SIGN ASSEMBLY

TECHNICAL FIELD

The invention relates to illuminated sign assemblies which have pivotal connections.

BACKGROUND OF THE INVENTION

School buses have commonly included illuminated stop signs which extend from the side of the bus to notify a potentially passing vehicle to stop allowing children to safely cross the road.

Furthermore, it is known that a stop sign for a bus can be pivotal with respect to the side of the bus to extend during stopping and unloading or loading of passengers. Exemplary of such design is U.S. Pat. No. 5,357,239 issued Oct. 18, 1994 and assigned to the assignee hereof, which includes an actuator for pivoting the sign outwardly and against the bus in a stowed position. Other such designs are illustrated in U.S. Pat. No. 5,036,307, issued Jul. 30, 1991 in the name of Reavell et al; U.S. Pat. No. 4,559,518, issued Dec. 17, 1985 in the name of Latta, Jr.; U.S. Pat. No. 4,816,804, issued Mar. 28, 1989 in the name of Reavell; and U.S. Pat. No. 5,132,662, issued Jul. 21, 1992 in the name of Burch. Each of these disclose a planar stop sign connected by a bracket connected to a housing. Wires for any lights used thereon are extended on the external surface of the stop sign.

There is desire to redesign the stop sign to include conductors extending therein for protection of the circuitry and conductors along with aesthetic purposes.

Illuminated fixed-position signs with indicia thereon have been comprised of either neon lights, LEDs, fluorescent bulbs, etc. Such lights illuminate a portion of the sign to display indicia, such as words or symbols. Exemplary thereof is U.S. Pat. No. 4,891,896, issued Jan. 9, 1990 in the name of Boren which discloses a simulated neon sign wherein a housing includes raised letters. A pigmented translucent coating is applied to the letters so that light from the interior can pass through the indicia. To simulate the halo effect of a neon light, additional pigmented coating is applied to the nonprojecting region. Fluorescent bulbs are utilized to illuminate the display.

U.S. Pat. No. 5,299,109, issued Mar. 29, 1994 in the name of Grondal discloses an LED exit light fixture which includes a frame and cover therefore that has a translucent and nontranslucent portion to define the word EXIT. The light emitting diodes are positioned directly beneath the nontranslucent portions of the cover and adjacent the translucent portions in order to provide a uniform illumination of the word. Another type of LED exit lamp is illustrated in U.S. Pat. No. 5,303,124, issued Apr. 12, 1994 in the name of Wrobel.

U.S. Pat. No. 5,345,705, issued Sep. 13, 1994 in the name of Lawrence discloses a three-dimensional, contoured surface of a sign, which may include a light emitting diode therein to enhance the sign to a viewer.

SUMMARY OF THE INVENTION

The invention is a sign display system which comprises a sign assembly including a sign housing with an internal cavity. A light element is connected in the internal cavity illuminating at least a portion of the sign assembly and including a power conductor. At least one arm is connected to and extending outwardly from the sign housing with an internal arm channel in communication with the internal cavity and the power conductor extending therethrough. A mounting assembly including a mounting housing having an aperture therein extending to a mounting cavity receives the arm and the power conductor, and includes an actuator for pivoting the arm and the sign housing between retracted and extended position.

This provides a pivotal sign which initially encloses the power conductors through the pivotal arms, thereby avoiding deterioration problems of the prior art.

FIGURES IN THE DRAWINGS

Other advantages of the present invention will be readily appreciated as the same becomes better understood by reference to the following detailed description when considered in connection with the accompanying drawings wherein:

FIG. 1 is a general view of the school bus showing the subject invention;

FIG. 2 is a plan view of a first embodiment of the sign assembly;

FIG. 6 is a partially cut away plan view of a second embodiment of the sign assembly.

DESCRIPTION OF THE PREFERRED EMBODIMENT

Figure 3:
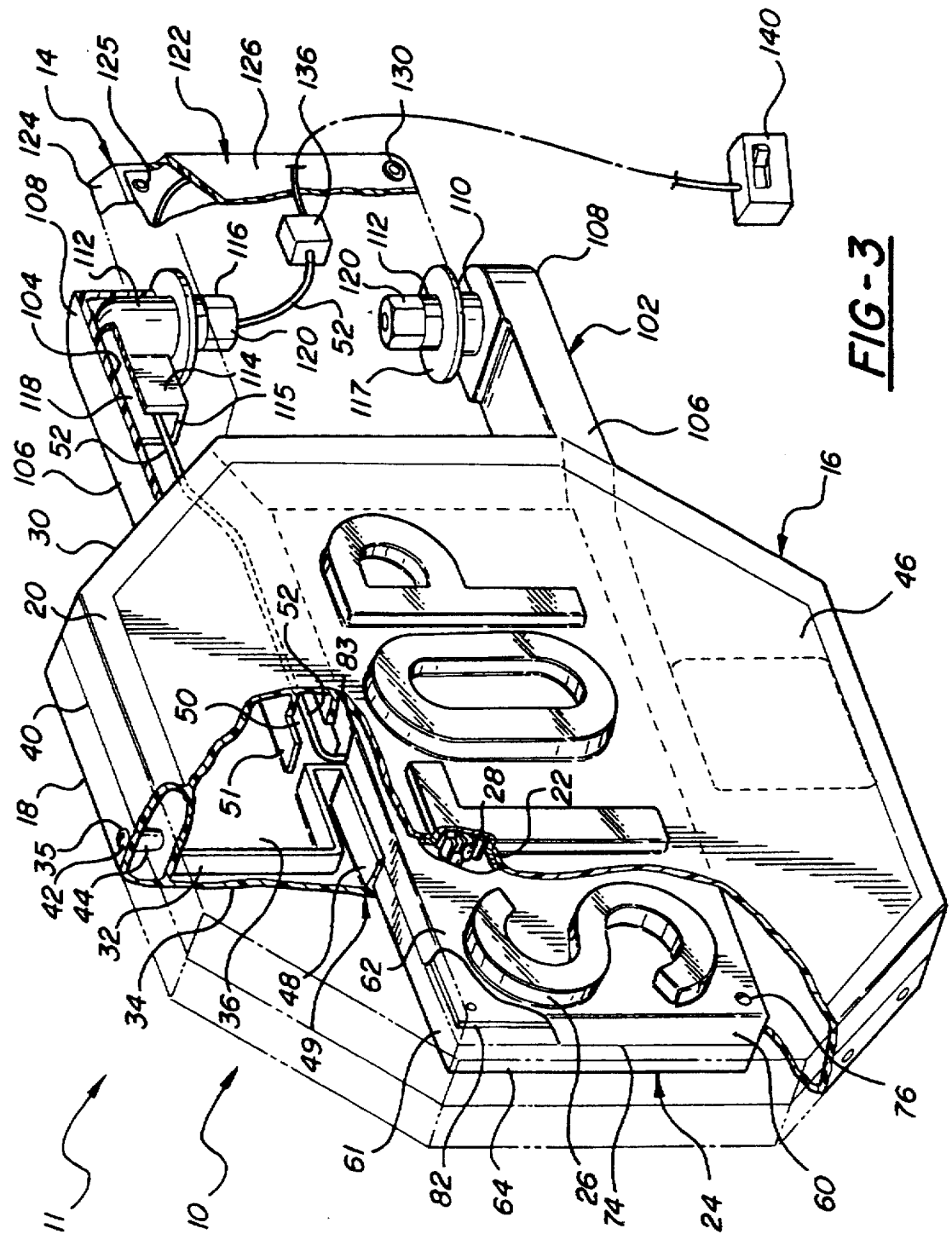
FIG. 3 is a partially cut away perspective view of the first embodiment of the sign assembly

A display system 11 is illustrated in FIG. 1 in an operative position on a school bus 12. The display system 11 is mounted on a school bus 12 and includes a sign assembly 10 which may pivot with respect to the school bus 12 by a mounting assembly 14. In operation, the sign assembly 10 is pivoted to lay against the school bus 12 in a non-use position and extends outwardly from the side of the school bus 12 in a perpendicular orientation in a use position, as illustrated. It is to be appreciated that the teachings of the sign assembly 10 may be utilized in various other applications and is not specifically limited to application of a school bus or the wording STOP.

A first embodiment of the sign assembly 10 is more specifically illustrated in FIGS. 2–5. The sign assembly 10 includes a molded sign housing 16 having front 18 and rear 20 faces with at least one slotted aperture 22 formed through the front and rear faces 18, 20 defining a predetermined shape. A lens 24 is connected to the sign housing 16 and has a raised surface portion 26 protruding through the slotted aperture 22 defining at least a portion of the predetermined shape. At least one light element 28 is connected to and behind the lens 24, opposite the sign housing 16, illuminating the raised surface portion 26 and the slotted aperture 22.

The sign housing 16 includes the front face 18 and rear face 20 opposing one another with peripheral side walls 30 connected between the front and rear faces 18, 20 providing a cavity 32 within the sign housing 16. More specifically, the sign housing 16 is formed by a front molded half 34 and a rear molded half 36, each including a portion or half of the side walls 30 extending therefrom to mating edges 40 to form the peripheral side walls 30 for sealing the sign housing 16. The front and ear molded halves 34, 36 are preferably injection molded of opaque plastic (i.e., black), but may be molded by other techniques commonly known in the art. The half portions of the side walls 30 taper away from one another at the mating edges 40 toward the front and rear faces 18, 20. In other words, the mating edge 40 extends slightly outwardly from the periphery of the front and rear faces 18, 20. The tapered side walls 30 aid in the sealing of the sign housing 16 by directing water or other moisture away from the mating edge 40. The mating edges 40 of the front and rear halves 34, 36 are also formed by L-shaped lips which mate and engage one another to seal the halves 34, 36 to one another forming the sign housing 16.

Figure 4:
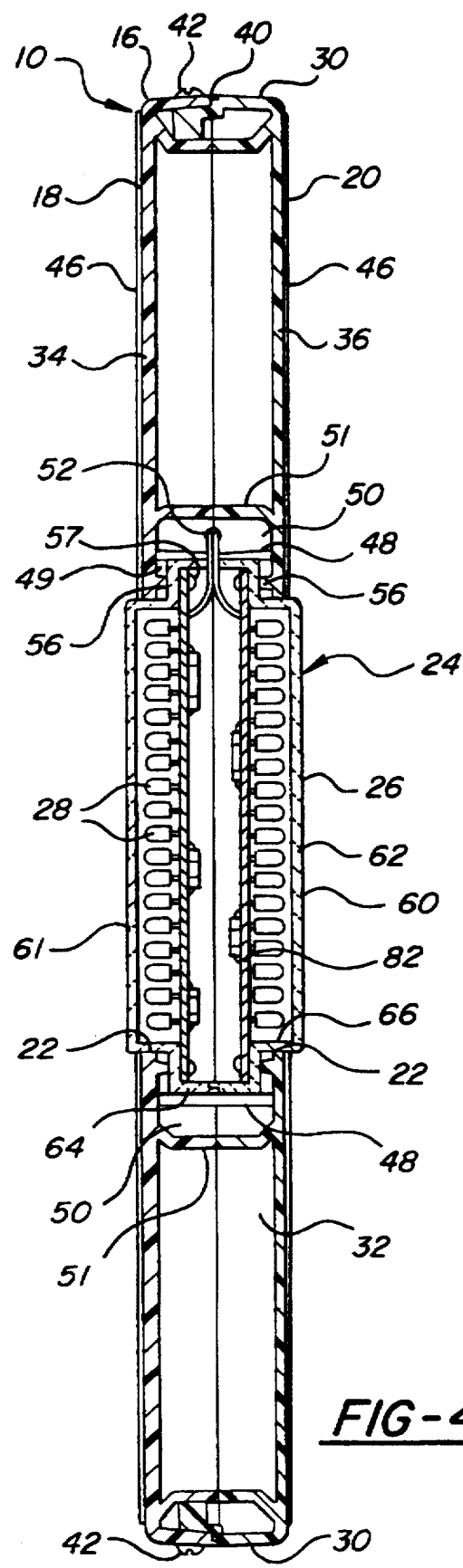
FIG. 4 is a cross-sectional view taken along lines 4—4 of FIG. 2.
Figure 5:
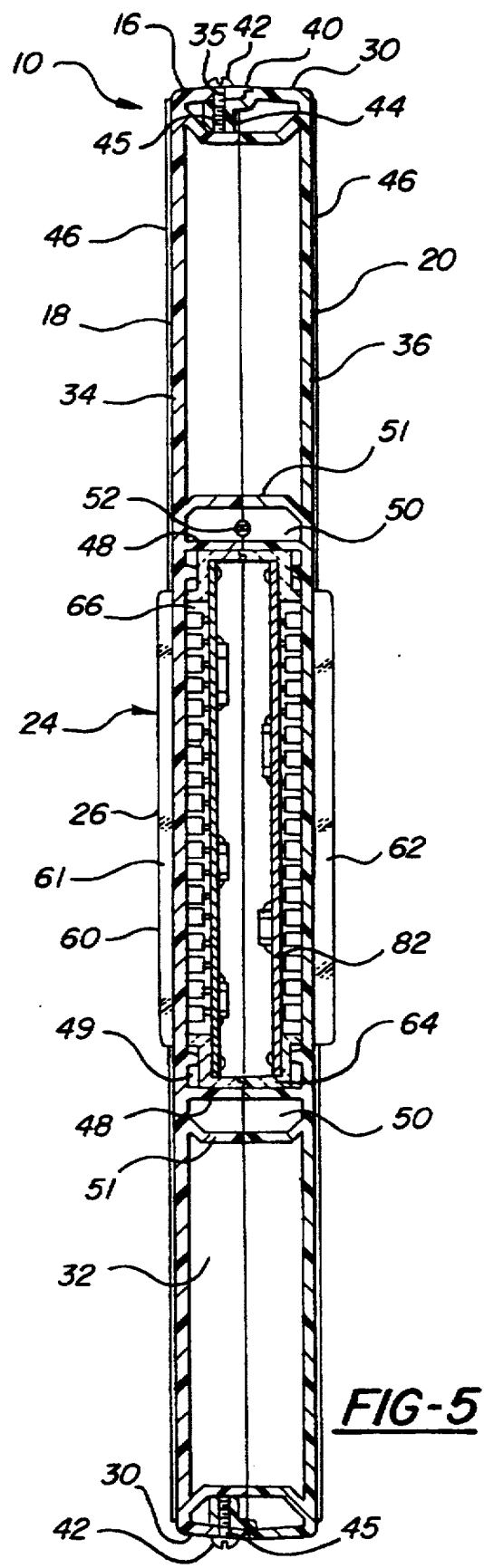
FIG. 5 is a cross-sectional view taken along lines 5—5 of FIG. 2.
Figure 7:
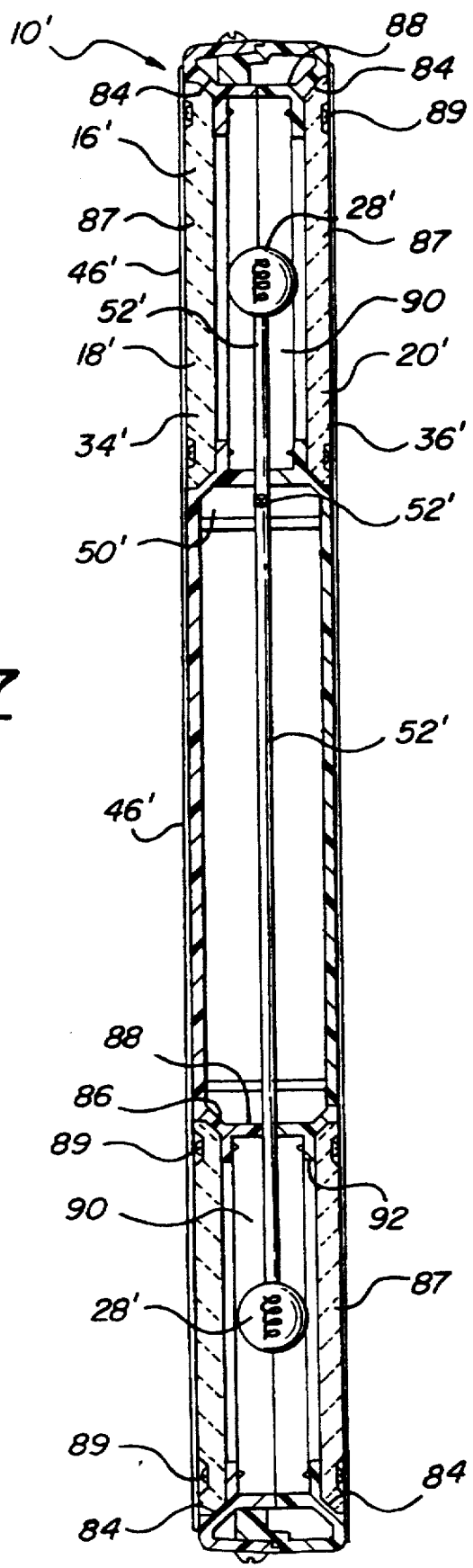
FIG. 7 is a cross-sectional view taken along lines 7—7 of FIG. 6.

The front and rear halves 34, 36 are securely connected to one another by fasteners 42 extending in the peripheral side walls 30 parallel with the front and rear faces 18, 20. More specifically, as illustrated in FIGS. 3–5, one of the side walls 30 includes a flange 44 extending beyond the respective mating edge 40 to lay against the half portion of the side wall 30 of the other of the halves 34, 36. The outward end of the flange 44 includes a flange aperture 45. The flange aperture 45 is aligned with a wall aperture 35 to receive the fastener 42 therethrough to connect the halves 34, 36 to one another.

Each of the front and rear faces 18, 20 are generally planar and include a reflective sheet of material 46 applied to the faces 18, 20. This material 46 may be a retro-reflective material such as by 3M™. Such material is commonly used as a reflected element for signs or other types of markers. The reflective material 46 includes a standard STOP design thereon in red and white colors and of hexagon shape and outline. However, any other design may be utilized as required. The reflective material 46 includes openings therethrough in the letters forming the word STOP, which are aligned with the slotted apertures 22 in the front and rear faces 18, 20.

The slotted aperture 22 in the sign housing 16 includes a plurality of slotted apertures to form the predetermined shape, such as alphabetic characters forming the word STOP. The slotted apertures 22 are shaped in the form of the letters STOP and are formed in both the front face 18 and rear face 20. It should be apparent that the word STOP can be externally read from the front face or from the rear face, both faces 18, 20 similarly constructed to provide a two sided sign assembly 10. The slotted apertures 22 receive the raised surface portions 26 of the lens 24 therethrough as subsequently discussed.

The interior surfaces of the front and rear faces 18, 20 include ribs 48 extending internally in the cavity 32 to outline the lens 24 forming a lens receptacle 49. The ribs 48 extend from each face 18, 20 and contact each other when assembled to aid in support of the sign assembly 10. The lens receptacle 49 provides a generally rectangular shape larger than and extending about the area containing the slotted apertures 22 forming the word STOP. A top and bottom channel 50 is formed extending from the center of the lens receptacle 49 by a second rib 51 to the arms 102 (subsequently discussed) to receive an electrical conductor 52. The channel 50 allows the conductors 52 from the light element 28 to leave the lens receptacle 49 formed by the ribs 48. The channel 50 extends from the lens receptacle 49, and along the length thereof to the mounting arms 102, as subsequently discussed.

Each of the front and rear faces 18, 20 also include on their interior side a plurality of mounting bosses 56 extending therefrom the corners established by the lens receptacle 49 and for receiving a fastener 57 to secure the lens 24.

The lens 24 includes a lens housing 60 for containing the light element 28 therein. The lens housing 60 is generally of a rectangular box shape and includes a front lens 61 and a rear lens 62, and has lens sides 64 interconnecting the lenses 61, 62 to seal the lens housing 60 providing a lens cavity 66 therein. The lens housing 60 is generally a transparent or translucent material to allow the light element 28 to illuminate therethrough. The lens housing 60 is of a dimension to fit within the lens receptacle 49 of the sign housing 16. Each of the front and rear lenses 61, 62 include the raised surface portions 26 extending therefrom which are formed of alphabetic characters or other indicia, such as the word STOP. The raised surfaces 26 are formed of a dimension and configuration to fit through the slotted apertures 22 of the sign housing 16. Therefore, the raised surfaces 26 are also in the form of the word STOP. The raised surfaces 26 generally include a radius top surface. The height of the raised surface portions 26 is greater than the thickness of each of the front and rear faces 18, 20 so that the raised surfaces 26 protrude through and extend past the front and rear faces 18, 20. This allows the raised surface portions 26 to project above the planar surface of the front face and rear face 18, 20 so that during illumination, such illumination is visible either from directly looking on the faces 18, 20, or by looking at the side of the sign 10.

The lens housing 60 is injection molded from clear or translucent plastic material, though other manufacturing methods may be utilized. The lens housing 60 includes the front and rear halves providing the front and rear lenses 61, 62, each with portions of sides 64 extending therefrom to mate at their edges 74 to produce the box-like structure of the lens housing 60. The edges 74, as with the mating edges 40 of the sign housing 16, also include an L-shaped lip to seal the lens housing 16.

The lens housing 60 includes at least four mounting apertures 76 on each half face 61, 62 adjacent the corners thereof aligned with the mounting bosses 56, to receive the fasteners 57 therethrough for securing to the mounting bosses 56 of the front sign face 18 and rear sign face 20, respectively. In other words, the front lens 61 is secured against the mounting bosses 56 of the front face 18, and the rear lens 62 is secured onto the mounting bosses 56 of the rear face 20. When the front and rear halves 34, 36 of the sign housing 16 are assembled against one another and fastened, the edges 74 of the front and rear halves of the lens housing 60 will be securely placed and engaged against one another.

The light element 28 comprises a plurality of light emitting diodes (LEDs) to illuminate the word STOP through the sign housing 16. The plurality of LEDs 28 are positioned in a single row, spaced from one another, forming each letter of the word STOP. Such LEDs 28 are generally formed and secured onto a substrate or circuit board 82 by known techniques. In the preferred embodiment, a single row of LEDs 28 is utilized for each letter as illustrated. The circuit board 82 is of a size slightly less than the dimension of the lens cavity 66 so that the board 82 and LEDs 28 may be sealed within the lens housing 60. In the preferred embodiment, two boards 82 are utilized with LEDs 28 positioned in the location of the appropriate letters, and are located back-to-back so that the LEDs 28 of each board 82 extend up into the raised surface 26 of each of the front lens 61 and rear lens 62, respectively.

In assembly, the circuit boards 82 are aligned with the respective front or rear lens 61, 62, and the lens fasteners 57 are inserted through the board 82 and lens 61, 62 and into the mounting boss 56 on the sign housing 16. This secures the board 82 and lens 61, 62 to each of the respective halves 34, 36 of the sign housing 16. Extending from the boards 82 are the conductors 52 to supply power to the LEDs 28. The lens housing 60 includes an aperture 83 therein to allow the conductors to pass therethrough and into the channel 50 of the sign housing 16.

As can be appreciated, the LEDs 28 are sealed within the sign housing 16 by both the sign housing 16 and by the lens housing 60. This prevents deterioration of the electronics due to atmospheric conditions.

A second embodiment 10' is also disclosed. The housing 16' is molded to allow an alternative embodiments to be formed therefrom, where the slotted apertures 22 and raised surfaces 26 are omitted so that the front and rear faces 18', 20' extend continuously planar. The same injection molds of the two housing halves 34, 36 may be used, with different portions cut therefrom.

Like primed numerals are used to identify similar parts of the first embodiment. In this embodiment, flashing lights 58 may be inserted above and below the word STOP, as are positioned in the prior art. A reflective material 46' is utilized displaying the STOP letters without opening in the words as in the first embodiment. The subject invention includes rectangular or square openings 84 in the front and rear faces 18', 20' to receive rectangular shaped lenses 87 therein. The sign housing 16' includes a recessed flange 86 for supporting the light lenses 87 so that the outer surface of the flashing light lenses 87 are substantially coplanar or flush with the outer surface of the front and rear faces 18', 20', respectively. A peripheral rib 88 extends from the flange 86 to provide a light chamber 90 when the halves 34', 36' are assembled. A light 28', such as fluorescent light or LEDs, are connected in the chamber 90. Power conductors 52' therefor are fed out of the chamber 90 into the channel 50' as in the first embodiment. Also included are a plurality of mounting bosses 92 connected at the corners of the flange 86 to allow for installation of flashing lights 58 with the fasteners 89.

As can be seen with the two embodiments, the first and second embodiment sign housings 16, 16' may be molded from the same injection mold. Depending on the desired embodiment, the molded halves 34, 36, 34', 36' may be cut out at either the STOP letters 22 or the flashing lights 58 locations with appropriate added components of either the lens housing 60, etc. or the flashing lights 58. The internal structure of the housing 16, 16' remains the same for either embodiment.

The sign assembly 10, 10' (in both embodiments) includes two mounting arms 102, 102' extending outwardly therefrom to engage and be pivoted by the mounting assembly 14, 14'. FIG. 3 best illustrates the construction of the mounting arms 102, 102', though both embodiments use the same design.

The mounting arms 102 include an internal arm channel 104 in communication with the channels 50. The mounting arms 102 include a pair of housing extension arms 106 which extend a length parallel with one another and outwardly from a side of the sign housing 16 to an L-shaped bend 108. The extension arms 102 are integral with the front molded half 34 and rear molded half 36, each formed by the front and rear halves 34, 36. In other words, the extension arms 102 are formed of two halves as with the remainder of the sign housing 16. The arm channel 104 extends through the L-shaped bend 108 to an arm opening 110. The arm opening 110 of each of the extension arms 106 face one another across a gap.

The mounting arms 102 include a hollow metal L-shaped bushing 112 which is inserted within the arm openings 102 and arm channels 104 of each of the arms 106. The bushings 112 include a first leg 114 having a first open 115 end receiving the power conductor 52 and extending through the L-shaped bend to a second leg 116. The first leg 114 includes an open upper side 118 so that the power conductor 52 may be directly fed dow the second leg 116 along a substantially straight angle. In other words, the conductor 52 may be fed through the open upper side 118 and straight down the second leg 116, and then laid against the first leg 114 pulled to follow the L-shaped bend after the conductor is fully fed through the bushing 112.

The second leg 116 includes a male shaped end 120. In the preferred embodiment, the male shaped end 120 is of a hexagon shape as in the prior art and has an opening therethrough. The conductors 52 are extended through the housing channel 50 and arm channel 104 and through the bushing 112 to the mounting assembly 14. A bearing plate 117 is formed with the bushing 112 to act against the mounting assembly 14. A wear washer may also be placed against the bearing plate 117.

The mounting assembly 14 includes a molded mounting housing 122 having a base 124 and a cover 126 with opposing mounting openings (not shown) for receiving the bushings 112. The base 124 is secured to the bus 12 by mounting fasteners 125. The base 124 and cover 126 are fastened to one another via fasteners 130. The mounting housing 122 supports an actuator (not shown) which is connected to the bushings 112. The actuator may be of any type known in the art, and that particularly described in United U.S. Pat. No. 5,357,239. The conductors 52 extend through the bushing 112 to flashing control circuitry 136. The control circuitry 136 powers and flashes the LEDs or flashing lights 58. The control circuitry 136 receives a control signal from the bus operator via a selecting switch 140, which switch 140 may also causes the red lights 200 on the upper ends of the bus 12 to flash.

The sign 10, 10' is assembled as follows. In the first embodiment 10, the slotted apertures 22 are cut out of both molded halves 34, 36. The LEDs 28 are placed on both of the boards 82 in the predetermined shape. The halves of the lens housing 60 and the boards 82 are attached to the front and rear faces 18, 20 of the front molded half 34 and rear molded half 36 of the sign housing 16 at the mounting bosses 56. Thereafter, the conductors 52 are run through one of the channels 50 and along one of the mounting arms 102 and stretched through the bushing 116. The bushing 112 is laid within the arm opening 104 in the appropriate location. Thereafter, the front molded half 34 and the rear molded half 36 are placed against one another and fasteners 42 connected within the side wall 38.

In the second embodiment 10', the areas over the recessed flanges 86 are cut out in each half 34', 36'. A lens 87 is connected by fasteners 89 in the recessed aperture to be flush with the front and rear faces 18', 20'. Lights 91 are fixedly connected behind the lenses 87 on one of the halves 34', 36'. The conductors 52' are run through one of the channels 50' and out one of the arms 102. Thereafter, the halves 34', 36' are connected to one another.

Thereafter, the sign assembly 10, 10' may be mounted on the hinge assembly 14, 14' by placing the bushings 112, 112' in the mounting openings, and clamping the housing cover 126 onto the base 124.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

What is claimed is:

1. A sign display system comprising:
   a sign assembly including a sign housing with an internal housing cavity, a light element connected in said internal housing cavity illuminating at least a portion of said sign assembly and including a power conductor, and at least one arm connected to and extending outwardly from said sign housing with an internal arm channel in communication with said internal housing cavity, said power conductor extending through said internal housing cavity and said internal arm channel; and
   a mounting assembly including a mounting housing having an aperture therein extending to a mounting cavity receiving said arm and said power conductor, and including an actuator for pivoting said arm and said sign housing between retracted and extended position.

2. A system as set forth in claim 1 wherein said at least one arm is substantially L-shaped with said power conductors extending therein between said sign housing and said mounting assembly.

3. A system as set forth in claim 2 further including a second arm connected between said sign housing and said mounting assembly.

4. A system as set forth in claim 2 wherein said arm includes a housing extension arm integral with said sign housing and extending outwardly therefrom, and a bushing arm extending within said housing extension arm to said mounting assembly.

5. A system as set forth in claim 4 wherein said at least one arm includes a hollow bushing and said bushing includes a first leg having a first open end receiving said power conductors extending to a second leg through an L-shaped bend, said first leg including an open side so that said power conductor can be fed through said bushing.

6. A system as set forth in claim 5 wherein said second leg includes a shaped male member, said actuator including a female member matingly engaged with said male member controlling pivotal movement thereof.

7. A system as set forth in claim 6 wherein said sign housing and said housing extension arm includes two molded halves fastened to one another securing said first leg of said bushing therein with said second leg extending therefrom.

8. A system as set forth in claim 3 wherein said second arm includes a housing extension arm integral with said sign housing and extending outwardly therefrom, and a bushing arm extending within said housing extension arm to said mounting assembly and wherein said housing extension arms extend parallel with one another to L-shaped bends that extend toward one another.

9. A system as set forth in claim 8 wherein said second arm includes an identical bushing.

10. A system as set forth in claim 9 wherein said sign housing and said extension arm comprising a rigid plastic material.

11. A system as set forth in claim 6 wherein said second leg includes a bearing plate integral with said bushing.

12. A system as set forth in claim 6 wherein said mounting housing includes a control circuit receiving said power conductors to selectively supply power to said light element.

13. A sign assembly adapted for pivotal connection to a mounting member comprising:
   a sign housing having an internal housing cavity,
   a light element connected in the internal housing cavity for illuminating at least a portion of the sign assembly,
   an arm connected to and extending outwardly from the sign housing,
   the arm having a hollow bushing defining an axis transverse to the arm for pivotally connecting the sign housing to a mounting member,
   the arm having an internal arm channel in communication with the internal housing cavity and with the hollow bushing,
   the bushing having an outlet, and
   the light element including a power conductor that extends through the internal housing cavity, the arm channel, the hollow bushing and the outlet so that the power conductor is not exposed when the sign housing is pivotally connected to the mounting member by the bushing.

14. A sign assembly adapted for pivotal connection to a mounting member comprising:
   a sign housing having an internal housing cavity,
   a light element connected in the internal housing cavity for illuminating at least a portion of the sign assembly,
   an arm connected to and extending outwardly from the sign housing,
   the arm having a hollow bushing for pivotally connecting the sign housing to a mounting member,
   the arm having an internal arm channel in communication with the internal housing cavity and with the hollow bushing,
   bushing having an outlet,
   the light element including a power conductor that extends through the internal housing cavity, the arm channel, the hollow bushing and the outlet so that the power conductor is not exposed when the sign housing is pivotally connected to a mounting member by the bushing and the bushing being a separate L-shaped member that has a first leg disposed in the internal arm channel and a second leg that projects outwardly of the arm for pivotally connecting the sign housing to the mounting member, and
   the outlet being located in a portion of the second leg that is located outwardly of the arm.

15. The sign assembly as defined in claim 14 wherein:
   the arm is an integral extension of the sign housing; and
   the arm and the sign housing include two molded halves fastened to one another securing the first leg of the bushing to the arm.

16. The sign assembly as defined in claim 14 wherein:
   the external portion of the second leg includes a male member having a torque responsive surface for controlling pivotal movement of the sign assembly.

17. The sign assembly as defined in claim 14 wherein:
   the first leg has an open side so that the power conductor can be inserted axially into the second leg and then bent into the first leg through the open side.

18. A bushing for pivotally connecting a sign housing to a mounting member, the sign housing having a light element that includes a power conductor, the bushing comprising:
   an L-shaped member that has a first leg and a second leg that are substantially perpendicular to each other,
   the first leg and the second leg each having a conductor passage that communicate with one another at a juncture of the first leg and the second leg and each having an opening at an end remote from the juncture, and the first leg being adapted for connection to a sign housing, and the second leg having a round cylindrical portion between the juncture and the opening of the second leg for pivotal connection to a support member whereby the sign housing is adapted to be pivotally connected to the support member with the power conductor passing from the sign housing to the support member through the bushing.

19. The bushing as defined in claim 18 wherein:
the second leg includes a male portion having a torque responsive surface for controlling pivotal movement of a sign housing.

20. The bushing as defined in claim 18 wherein:
the first leg has an open side so that a power conductor can be inserted through the conductor passage of the second leg axially and then laterally into the conductor passage of the first leg through the open side.

* * * * *